US008709588B2

(12) United States Patent
Cadet et al.

(10) Patent No.: US 8,709,588 B2
(45) Date of Patent: Apr. 29, 2014

(54) OPTICAL ARTICLE COMPRISING A TEMPORARY ANTI-FOGGING COATING WITH IMPROVED DURABILITY

(75) Inventors: Mamonjy Cadet, Charenton le Pont (FR); Mathieu Feuillade, Charenton le Pont (FR); Francis Henky, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 318 days.

(21) Appl. No.: 13/260,697

(22) PCT Filed: Dec. 22, 2010

(86) PCT No.: PCT/FR2010/052895
§ 371 (c)(1),
(2), (4) Date: Sep. 27, 2011

(87) PCT Pub. No.: WO2011/080472
PCT Pub. Date: Jul. 7, 2011

(65) Prior Publication Data
US 2012/0019767 A1 Jan. 26, 2012

(30) Foreign Application Priority Data

Dec. 31, 2009 (FR) ...................................... 09 59685
Apr. 28, 2010 (FR) ...................................... 10 53269

(51) Int. Cl.
*B32B 37/00* (2006.01)
(52) U.S. Cl.
USPC .................................................... 428/304.4

(58) Field of Classification Search
USPC ...................... 428/304.4, 315.9; 264/1.4, 1.7; 427/256, 162; 351/159.01; 128/206.19
See application file for complete search history.

(56) References Cited

U.S. PATENT DOCUMENTS

| 5,997,621 | A  | 12/1999 | Scholz et al. ................... 106/13 |
| 6,251,523 | B1 | 6/2001  | Takahashi et al. ............ 428/428 |
| 6,379,776 | B1 | 4/2002  | Tada et al. ..................... 429/149 |

(Continued)

FOREIGN PATENT DOCUMENTS

| EP | 0 871 046 | 10/1998 |
| EP | 1 275 624 | 1/2003 |

(Continued)

OTHER PUBLICATIONS

PCT International Search Report issued in International application No. PCT/FR2010/052895, dated Jun. 30, 2011.

*Primary Examiner* — Hung Dang
(74) *Attorney, Agent, or Firm* — Fulbright & Jaworski LLP

(57) ABSTRACT

The present invention relates to an optical article comprising a substrate provided with a coating comprising silanol groups on the surface thereof and, directly contacting this coating, an anti-fog coating precursor coating, said precursor coating having a static contact angle with water of more than 10° and of less than 50°, a thickness lower than or equal to 5 nm, and being obtained through the grafting of at least one organosilane compound having a polyoxyalkylene group comprising less than 80 carbon atoms and at least one silicon atom bearing at least one hydrolyzable group. The anti-fog coating precursor is converted into an actual anti-fog coating by applying on the surface thereof a film of a liquid solution comprising at least one surfactant. The anti-fog coating is immediately operational and provides long-lasting effects.

25 Claims, 1 Drawing Sheet

(56) References Cited

U.S. PATENT DOCUMENTS

| | | |
|---|---|---|
| 6,546,344 B1 | 4/2003 | Rodrian et al. ............. 702/65 |
| 7,703,456 B2 * | 4/2010 | Yahiaoui et al. ......... 128/206.19 |
| 2005/0008784 A1 | 1/2005 | Martin et al. .............. 427/393.4 |
| 2006/0088666 A1 | 4/2006 | Kobrin et al. ................ 427/569 |
| 2006/0251795 A1 | 11/2006 | Kobrin et al. ................ 427/2.1 |
| 2007/0197681 A1 | 8/2007 | Lowery et al. .................. 523/1 |

FOREIGN PATENT DOCUMENTS

| | | |
|---|---|---|
| EP | 1 324 078 | 7/2003 |
| EP | 1 418 211 | 5/2004 |
| EP | 1 688 469 | 8/2006 |
| JP | 2002-240186 | 8/2002 |
| JP | 2002-308651 | 10/2002 |
| JP | 2004-317539 | 11/2004 |
| JP | 2005-281143 | 10/2005 |
| WO | WO 01/68384 | 9/2001 |
| WO | WO 2004/035323 | 4/2004 |
| WO | WO 2004/046791 | 6/2004 |
| WO | WO 2010/049887 | 5/2010 |

* cited by examiner

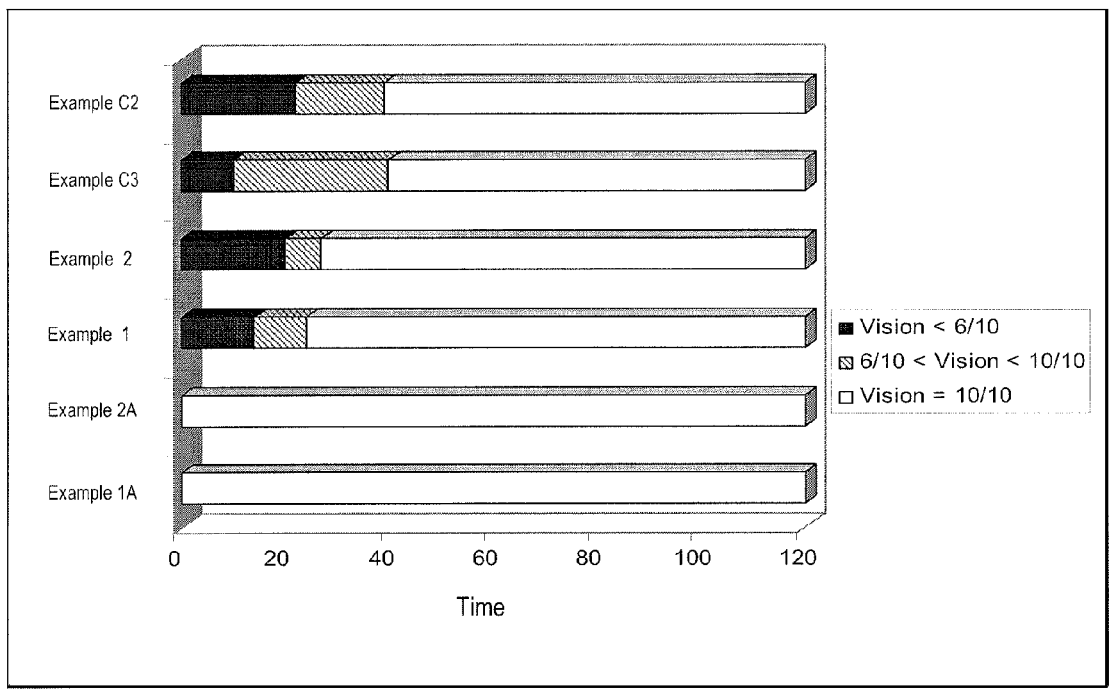

OPTICAL ARTICLE COMPRISING A TEMPORARY ANTI-FOGGING COATING WITH IMPROVED DURABILITY

This application is a national phase application under 35 U.S.C. §371 of International Application No. PCT/FR2010/052895 filed 22 Dec. 2010, which claims priority to French Application No. 0959685 filed on 31 Dec. 2009 and French Application No. 1053269 filed 28 Apr. 2010. The entire text of each of the above-referenced disclosures is specifically incorporated herein by reference without disclaimer.

The present invention relates to an optical article provided with a coating comprising silanol groups on the surface thereof, typically an antireflective coating, the surface of which has been modified so as to enable an efficient and long-lasting application of a temporary anti-fog solution, as well as to a method for making such an optical article.

Very numerous supports, such as plastic materials and glass, suffer as a drawback from becoming covered with fog when their surface temperature decreases below the dew point of ambient air. This is especially the case with the glass that is used to make glazings for transportation vehicles or buildings, glasses for spectacles, lenses, mirrors, and so on. The fogging that develops on these surfaces leads to a decrease in transparency, due to the diffusion of light through water drops, which may cause a substantial discomfort.

To prevent any fog formation in very damp environments, that is to say the condensation of very little water droplets on a support, it has been suggested to apply hydrophilic coatings onto the outer surface of such support, with a low static contact angle with water, preferably of less than 50°, more preferably of less than 25°. Such permanent anti-fog coatings do act as sponges toward fog and enable the water droplets to adhere to the surface of the support by forming a very thin film that gives an impressure of transparency. These coatings are generally made of highly hydrophilic species such as sulfonates or polyurethanes.

Commercially available products comprise several micrometer-thick hydrophilic layers.

As a rule, when the thickness of the coatings is high (several microns), these coatings, as a consequence of water absorption, do swell, soften and become mechanically less resistant.

As used herein, a permanent anti-fog coating is intended to mean a coating which hydrophilic properties result from hydrophilic compounds permanently bound to another coating or support. The application EP 1324078 describes a lens coated with an abrasion-resistant coating and a multilayered antireflective coating comprising layers with high and low refractive indexes alternating with each other, amongst which the outer layer is a low refractive index layer (1.42-1.48) of from 5 to 100 nm thickness forming an anti-fog coating consisting in a hybrid layer with a static contact angle with water of less than 10°, obtained through vacuum deposition of both simultaneously an organic compound and silica or of silica and alumina, that is to say through coevaporation of these various components. The anti-fog coating preferably comprises from 0.02 to 70% by weight of the organic compound relative to the coating total weight, and typically from 6 to 15% by weight, according to the examples.

Said organic compound comprises one hydrophilic group and one reactive group, for example a trialkoxysilyl group having from 3 to 15 carbon atoms, and has preferably a molecular weight ranging from 150 to 1500 g/mol. Some preferred compounds possess a polyether backbone, especially one polyoxyethylene and one reactive group on each end of the molecule. Preferred compounds include polyethylene glycol glycidyl ether, polyethylene glycol monoacrylate and N-(3-trimethoxysilylpropyl)gluconamide.

The anti-fog coating therefore comes as a silica-based layer (or a silica+alumina-based layer) incorporating one hydrophilic organic compound. However, its anti-fog character does change over time, and it can be observed a stepwise deterioration of the anti-fogging properties. When becoming too low, they may be restored through a "washing treatment" of the anti-fog film, particularly a plasma-mediated treatment.

In the practice, the coevaporation method of the application EP 1324078 is very complicated to implement. It would be preferable to have a method for making an anti-fog coating without carrying out any coevaporation process.

The American patents U.S. Pat. Nos. 6,251,523 and 6,379,776 describe an antireflective, anti-fog glass for cars or lenses, comprising a glass substrate provided with an antireflective coating based on 110-250 nm-thick silica with a surface roughness Ra of about 5-10 nm, in turn provided with a 8 nm-thick permanent anti-fog coating obtained through liquid or vapor deposition of the compound $CH_3O-(CH_2CH_2O)_{6-9}-(CH_2)_3Si(OCH_3)_3$ or a hydrolyzate thereof. At the initial stage, the anti-fog coating has a static contact angle with water of 3°.

Another solution to combine antireflective and antifogging properties consists in using a thin porous low refractive index layer, partially made of surfactants, which enable the layer to acquire anti-fogging properties. This layer is generally deposited onto a hydrophilic surface.

Thus, the U.S. Pat. No. 5,997,621 describes a porous antireflective and anti-fog coating based on metal oxides (silica beads) and relatively water-soluble anionic surfactants, having generally an ionic hydrophilic head of the carboxylic acid, sulfonate, or phosphate type and a fluorinated chain. In order to be immobilized on a substrate, the surfactants are preferably able to covalently bind to the metal oxides. The application WO 97/43668 describes a similar construction.

The application EP 0871046 describes an antireflective and anti-fog system comprising one inorganic oxide-based porous layer deposited onto a few micrometer-thick water absorbing layer, obtained through polycondensation of an inorganic alkoxide hydrolyzate in the presence of a polyacrylic acid compound. The porous layer, which acts as the antireflective barrier, allows water to access the absorbing layer.

Antifogging properties may also be obtained by applying temporary solutions commercially available as sprays or towelettes, onto spectacle glasses comprising as the outer layer an antifouling coating (hydrophobic and oleophobic), often considered as essential when ophthalmic glass is provided with an antireflective coating. They make it possible to obtain the antifogging property on a short period of time. The ease of soil removal aspect that is given to the antifouling coating is preserved, but after a couple of wiping operations, the anti-fogging property is significantly altered. Indeed, temporary solutions comprise materials that are hydrophilic in nature with poor interactions with the antifouling coating hydrophobic surface, so that after a few wiping operations, these hydrophilic materials are removed.

A more interesting solution consists in making an anti-fog coating by applying a temporary hydrophilic solution onto the surface of an anti-fog coating precursor coating, which represents an alternative to permanent anti-fog coatings.

The application EP 1275624 describes a lens coated with a hard, inorganic, hydrophilic layer based on metal oxides and silicon oxide. Its hydrophilic nature and the presence of nano-sized concave portions on the surface thereof enable to impregnate a surfactant and to retain the same adsorbed over a long period of time, thus maintaining an anti-fog effect for several days. However, an anti-fog effect can also be observed in the absence of any surfactant.

The applications JP 2004-317539 and JP 2005-281143 describe a lens coated with a multilayered antireflective coating and/or with an abrasion-resistant coating and with an anti-fog coating precursor coating, having a static contact angle with water of from 50° to 90°. The anti-fog coating as such, which is a temporary coating, is obtained after application of a surfactant onto the surface of the precursor coating.

The anti-fog coating precursor coating is obtained from a composition comprising an organic compound comprising an hydrophilic group of polyoxyethylene nature, a reactive group capable of reacting with the outer layer of the antireflective coating, especially a silica-based layer, such as alkoxysilane $Si(OR)_n$, silanol SiOH or isocyanate groups, and optionally a fluorinated hydrophobic group, and the composition is chosen so that the static contact angle with water of the anti-fog coating precursor coating varies from 50° to 90°. The organic compounds used in the anti-fog coating precursor preferably have a, molecular weight ranging from 700 to 5000 or from 430 to 3700 g/mol. To be mentioned as examples of such compounds are the $CH_3O(CH_2CH_2O)_{22}CONH(CH_2)_3Si(OCH_3)_3$ or $C_8F_{17}O(CH_2CH_2O)_2CONH(CH_2)_3Si(OCH_3)_3$ compounds. The precursor coating is described as being 0.5 to 20 nm thick. The relatively high contact angle of the precursor coating is expected because it enables, according to these applications, to easily remove soils resulting from the drying of water drops.

However scientists still look for temporary anti-fog coating compositions from which layers could be formed through easy-to-implement methods, which antifogging properties would be more efficient, which would last longer over time and/or under mechanical stresses, while preserving an acceptable cleanability.

Anti-fog coatings also having good mechanical properties (abrasion and scratch resistance) are still sought.

The present invention aims at preparing such temporary anti-fog coatings, which significantly improve the antifogging property durability, while preserving good mechanical properties.

It is a further objective of the present invention to provide an anti-fog coating that would be immediately operational, that is to say a coating which, when a transparent glass substrate coated with such coating is placed under conditions generating fog onto said substrate being devoid of said coating, enables to immediately attain (that is to say in less than one second) a vision >6/10 (visual acuity), and preferably of 10/10, without fog formation for an observer looking through a coated glass according to the Snellen E visual acuity scale (ARMAIGNAC scale (Tridents) (Snellen E) reading at 5M, ref. T6 available from FAX INTERNATIONAL), located at a distance of 5 meters.

It is a further objective of the present invention to provide an optical article having both antireflective and antifogging properties.

These objectives may be aimed at, according to the invention, thanks to a modification of the silanol groups on the surface of an optical article, by grafting thereto a particular organosilane compound.

Thus, the present invention relates to an optical article, preferably a lens for spectacles, comprising a substrate provided with a coating comprising silanol groups on the surface thereof and, directly contacting this coating, an anti-fog coating precursor coating, characterized in that the anti-fog coating precursor coating:

is obtained through the grafting of at least one organosilane compound possessing:
a polyoxyalkylene group, and
at least one silicon atom bearing at least one hydrolyzable group,
has a thickness lower than or equal to 5 nm,
has a static contact angle with water of more than 10° and of less than 50°.

The present invention further relates to an optical article, preferably a lens for spectacles, such as hereabove, the anti-fog coating precursor coating of which is furthermore coated with a film of a liquid solution comprising at least one surfactant. In other words, such optical article is provided with a temporary anti-fog coating according to the invention.

The invention will be described in more detail by referring to the appended drawing showing on FIG. 1 the evolution, as a function of time, of the antifogging properties of optical articles according to the invention and comparative optical articles, initially exposed to hot vapor.

In the present application, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coatings may be arranged between the substrate/coating and the coating in question (however, it is preferably in contact with said substrate/coating), and (iii) does not necessarily completely cover the substrate/coating. When "a layer 1 is arranged under a layer 2", it is intended to mean that layer 2 is more distant from the substrate than layer 1.

As used herein, an "anti-fog coating" is intended to mean a coating which, when a transparent glass substrate coated with such coating is placed under conditions generating fog onto said substrate being devoid of said coating, enables to immediately attain a visual acuity >6/10 for an observer looking through a coated glass at a visual acuity scale located at a distance of 5 meters. Several tests to evaluate the antifogging properties of a coating are described in the experimental section. Under fog generating conditions, anti-fog coatings may either not present fog on their surface (ideally no visual distortion, or visual distortion but visual acuity >6/10 under the hereabove mentioned measurement conditions), or may present some fog on their surface but yet enable, despite the vision perturbation resulting from fog, a visual acuity >6/10 under the hereabove mentioned measurement conditions. A non-anti-fog coating does not allow a visual acuity >6/10 as long as it is exposed to conditions generating fog and generally presents a condensation haze under the hereabove mentioned measurement conditions.

As used herein, an "anti-fog glass" is intended to mean a glass provided with an "anti-fog coating" such as defined hereabove.

Thus, the anti-fog coating precursor according to the invention, which is a hydrophilic coating, is not considered as being an anti-fog coating according to the present invention, even if it has some anti-fogging properties, which may be observed for example by means of a breath test described in the experimental section. Indeed, this anti-fog coating precursor does not allow to obtain a visual acuity >6/10 under the hereabove mentioned measurement conditions, as appears on FIG. 1, which will be discussed later on.

As used herein, a temporary anti-fog coating is intended to mean an anti-fog coating obtained after having applied a liquid solution comprising at least one surfactant onto the surface of a precursor coating of said anti-fog coating. The durability of a temporary anti-fog coating is generally limited by the wiping operations performed on the surface thereof, the surfactant molecules being not permanently attached to the surface of the coating but just adsorbed for a more or less durable period of time.

The optical article prepared according to the invention comprises a substrate, preferably transparent, having front and rear main surfaces, at least one of said main surfaces being provided with a coating comprising silanol groups on the surface thereof, preferably both main surfaces. As used herein, the rear face (generally concave) of the substrate is intended to mean the face which, when using the article, is the nearest from the wearer's eye. On the contrary, the front face (generally convex) of the substrate, is the face which, when using the article, is the most distant from the wearer's eye.

Although the article according to the invention may be any optical article that may encounter a problem of fog formation, such as a screen, a glazing for the automotive industry or the building industry, or a mirror, it is preferably an optical lens, more preferably an ophthalmic lens, for spectacles, or a blank for optical or ophthalmic lenses.

This excludes articles such as intraocular lenses which are in contact with living tissues or contact lenses, which do not intrinsically face the problem of fog formation, as opposed to glasses for spectacles.

According to the invention, the coating comprising silanol groups on its surface may be formed on at least one of the main surfaces of a bare substrate, that is to say a non coated substrate, or on at least one of the main surfaces of a substrate that has already been coated with one or more functional coatings.

The substrate for the optical article according to the invention may be a mineral or an organic glass, for example of a thermoplastic or thermosetting plastic material.

Especially preferred classes of substrates include poly (thiourethanes), polyepisulfides and resins resulting from the polymerization or (co)polymerization of alkyleneglycol bis allyl carbonates. These are sold, for example, under the trade name CR-39® by the PPG Industries company (ORMA® lenses, from ESSILOR).

In some applications, it is preferred that the substrate's main surface be coated with one or more functional coatings prior to depositing the coating comprising silanol groups on its surface. These functional coatings traditionally used in optics may be, without limitation, an impact-resistant primer layer, an abrasion-resistant coating and/or a scratch-resistant coating, a polarized coating, a photochromic coating or a tinted coating, particularly a impact-resistant primer layer coated with an abrasion-resistant layer and/or a scratch-resistant coating.

The coating comprising silanol groups on the surface thereof is preferably deposited onto an abrasion-resistant and/or a scratch-resistant coating. The abrasion-resistant and/or scratch-resistant coating may be any layer traditionally used as an abrasion-resistant coating and/or scratch-resistant coating in the ophthalmic lenses field.

The abrasion-resistant and/or scratch-resistant coatings are preferably hard coatings based on poly(meth)acrylates or silanes comprising generally one or more mineral fillers that are intended to improve the hardness and/or the refractive index of the coating once cured. As used herein, a (meth) acrylate is an acrylate or a methacrylate.

The abrasion-resistant coating and/or scratch-resistant hard coatings are preferably made from compositions comprising at least one alkoxysilane and/or a hydrolyzate thereof, obtained for example through hydrolysis with a hydrochloric acid solution, and optionally condensation and/or curing catalysts and/or surfactants.

Recommended coatings of the present invention include coatings based on epoxysilane hydrolyzates such as those described in the patents EP 0614957, U.S. Pat. Nos. 4,211, 823 and 5,015,523.

The thickness of the abrasion-resistant coating and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product.

This coating may be any impact-resistant primer layer traditionally used for articles in a transparent polymer material, such as ophthalmic lenses.

Preferred primer compositions include compositions based on thermoplastic polyurethanes, such as those described in the patents JP 63-141001 and JP 63-87223, poly(meth)acrylic primer compositions, such as those described in the patent U.S. Pat. No. 5,015,523, compositions based on thermosetting polyurethanes, such as those described in the patent EP 0404111 and compositions based on poly(meth)acrylic latexes or polyurethane type latexes, such as those described in the patents U.S. Pat. No. 5,316,791 and EP 0680492.

Preferred primer compositions are compositions based on polyurethanes and compositions based on latexes, particularly polyurethane type latexes and poly(meth)acrylic latexes, and their combinations. Primer layers generally have thicknesses, after curing, ranging from 0.2 to 2.5 μm, preferably ranging from 0.5 to 1.5 μm.

The coating comprising silanol groups on the surface thereof will be described hereafter. As used herein, a coating comprising silanol groups on the surface thereof is intended to mean a coating which naturally comprises silanol groups on the surface thereof or a coating which silanol groups have been created after having been submitted to a surface activation treatment. This coating is therefore a coating based on siloxanes or silica, for example, without limitation, a silica-based layer, a sol-gel coating, based on organosilane species such as alkoxysilanes, or a coating based on silica colloids. It may be especially an abrasion-resistant coating and/or a scratch-resistant coating, or, according to the preferred embodiment, a monolayered antireflective coating or a multilayered antireflective coating which outer layer has silanol groups on the surface thereof. As used herein, the outer layer of a coating is intended to mean the layer that is the most distant from the substrate.

The surface activating treatment generating the silanol groups or at least increasing their proportion on the surface of a coating is generally performed under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acidic or basic treatment and/or a solvent-based treatment (water, hydrogen peroxide or any organic solvent). Many of these treatments may be combined.

As used herein, energetic species (and/or reactive species) are intended to mean especially ionic species with an energy ranging from 1 to 300 eV, preferably from 1 to 150 eV, more preferably from 10 to 150 eV, and even more preferably from 40 to 150 eV. The energetic species may be chemical species such as ions, radicals or species such as photons or electrons.

The activating treatment may also be an acidic or a basic chemical surface treatment, preferably a wet treatment or a treatment using a solvent or a combination of solvents.

The coating comprising silanol groups on the surface thereof is preferably a low refractive index layer based on silica (comprising silica), most preferably it consists in a silica-based layer ($SiO_2$), generally obtained through vapor phase deposition.

Said layer based on $SiO_2$ may comprise, in addition to silica, one or more other materials traditionally used for making thin layers, for example one or more materials selected from dielectric materials described hereafter in the present specification. This layer based on $SiO_2$ is preferably free of $Al_2O_3$.

The inventors observed that it is not essential to carry out a surface treatment when the layer is a layer based on silica, particularly when obtained through evaporation.

The coating comprising silanol groups on the surface thereof preferably comprises at least 70% by weight of $SiO_2$, more preferably at least 80% by weight and even more preferably at least 90% by weight of $SiO_2$. As has already been noticed, in a most preferred embodiment, it comprises 100% by weight of silica.

The coating comprising silanol groups on the surface thereof may also be a sol-gel coating based on silanes such as alkoxysilanes, for example tetraethoxysilane or organosilanes such as γ-glycidoxypropyl trimethoxysilane. Such a coating is obtained through wet deposition, by using a liquid composition comprising a hydrolyzate of silanes and optionally colloidal materials with a high (>1.55, preferably >1.60, more preferably > to 1.70) or a low (≤1.55) refractive index. Such a coating which layers comprise an organic/inorganic hybrid matrix based on silanes wherein colloidal materials are dispersed to adjust the refractive index of each layer are described for example in the patent FR 2858420.

In one embodiment of the invention, the coating comprising silanol groups on the surface thereof is a layer based on silica deposited onto an abrasion-resistant coating, preferably deposited directly onto this abrasion-resistant coating.

Said layer based on silica (comprising silica) is preferably a silica-based layer, generally obtained through chemical vapor deposition. It has preferably a thickness lower than or equal to 500 nm, more preferably ranging from 5 to 20 nm, and even more preferably from 10 to 20 nm.

Preferably, the deposition of said layer based on silica is carried out by regulating the pressure, which means by adding gas to the deposition chamber, the gas being in a non ionic form, preferably by adding oxygen, at a pressure ranging typically from $5.10^{-5}$ to $5.10^{-4}$ mbar.

In another embodiment of the invention, which is the most preferred embodiment, the optical article according to the invention comprises an antireflective coating. When such a coating is present, it generally represents the coating comprising silanol groups on the surface thereof within the meaning of the invention. This antireflective coating may be any antireflective coating traditionally used in the optics field, particularly ophthalmic optics, provided it comprises silanol groups on its surface.

An antireflective coating is defined as a coating, deposited onto the surface of an optical article, which improves the antireflective properties of the final optical article. It makes it possible to reduce the light reflection at the article-air interface over a relatively large portion of the visible spectrum.

As is also well known, antireflective coatings traditionally comprise a monolayered or a multilayered stack composed of dielectric materials. These are preferably multilayered coatings, comprising layers with a high refractive index (HI) and layers with a low refractive index (LI).

In the present application, a layer of the antireflective coating is said to be a layer with a high refractive index when its refractive index is higher than 1.55, preferably higher than or equal to 1.6, more preferably higher than or equal to 1.8 and even more preferably higher than or equal to 2.0. A layer of an antireflective coating is said to be a low refractive index layer when its refractive index is lower than or equal to 1.55, preferably lower than or equal to 1.50, more preferably lower than or equal to 1.45. Unless otherwise specified, the refractive indexes referred to in the present invention are expressed at 25° C. at a wavelength of 550 nm.

The HI layers are traditional layers with a high refractive index, that are well known in the art. They generally comprise one or more metal oxides such as, without limitation, zirconia ($ZrO_2$), titanium dioxide ($TiO_2$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, $Dy_2O_5$, $Nb_2O_5$, $Y_2O_3$.

The LI layers are also well known and may comprise, without limitation, $SiO_2$, $MgF_2$, $ZrF_4$, alumina ($Al_2O_3$), $AlF_3$, chiolite ($Na_3Al_3F_{14}$), cryolite ($Na_3[AlF_6]$), and their combinations, preferably $SiO_2$ or $SiO_2$ doped with alumina. SiOF layers ($SiO_2$ doped with fluorine) may also be employed.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to $SiO_2+Al_2O_3$ total weight in this layer.

Generally speaking, HI layers have a physical thickness ranging from 10 to 120 nm, and LI layers have a physical thickness ranging from 10 to 100 nm.

Preferably, the total thickness of the antireflective coating is lower than 1 micrometer, more preferably lower than or equal to 800 nm and even more preferably lower than or equal to 500 nm. The total thickness of the antireflective coating is generally higher than 100 nm, preferably higher than 150 nm.

Still more preferably, the antireflective coating comprises at least two layers with a low refractive index (LI) and at least two layers with a high refractive index (HI). Preferably, the total number of layers in the antireflective coating is lower than or equal to 8, more preferably lower than or equal to 6.

HI and Li layers do not need to alternate with each other in the antireflective coating, although they also may, according to one embodiment of the invention. Two HI layers (or more) may be deposited onto each other, as well as two LI layers (or more) may be deposited onto each other.

The various layers in the antireflective coating preferably have been deposited by vapor phase deposition, under vacuum, according to any one of the following methods: i) by evaporation optionally ion-beam assisted; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

When the coating comprising silanol groups on the surface thereof is an antireflective coating, the luminous reflection factor of an article coated with such an antireflective coating, noted $R_v$, is of less than 2.5% per face, more preferably of less than 2% per face and even more preferably of less than 1% per face of the article. In a most preferred embodiment, the article comprises a substrate both main surfaces of which are coated with an antireflective coating according to the invention and has a total R, value (cumulated reflection of both faces) lower than 1.5%. The means to reach such IR, values are well known from the person skilled in the art.

In the present application, the "luminous reflection factor" is such as defined in the ISO standard 13666:1998, and is measured according to ISO 8980-4 standard, that is to say it is the weighted average of the spectral reflectivity within all the visible spectrum wavelength range from 380 to 780 nm.

Prior to forming the anti-fog coating precursor on the coating comprising silanol groups on the surface thereof, for example an antireflective coating, it is usual to submit the surface of such coating to a physical or chemical activation treatment intended to reinforce the adhesion of the anti-fog coating precursor. These treatments may be selected from those previously described for activating the coating comprising silanol groups on its surface.

According to the invention, the coating comprising silanol groups on the surface thereof is directly in contact with the precursor coating of an anti-fog coating, which will be described hereunder.

As used herein, "a precursor of an anti-fog coating" is intended to mean a coating which, if a surfactant-containing liquid solution is applied on the surface thereof so as to form a film, represents an anti-fog coating within the meaning of the invention. The system precursor coating+surfactant-based solution film represent the anti-fog coating as such.

The anti-fog coating precursor coating is a coating having a thickness lower than or equal to 5 nm, preferably of 4 nm or less, more preferably of 3 nm or less and even more preferably of 2 nm or less, possessing a static contact angle with water of more than 10° and of less than 50°, which is obtained through a permanent grafting of at least one organosilane compound possessing a polyoxyalkylene group and at least one silicon atom bearing at least one hydrolyzable group.

In one embodiment of the invention, the coating is deposited by applying a composition comprising a hydrolyzate of the organosilane compound possessing a polyoxyalkylene group and at least one silicon atom carrying at least one hydrolyzable group.

It is recommended to avoid any condensation of the hydrolyzed organosilane compounds so that they can keep as much as possible the silanol functions free to react so as to facilitate the grafting of these compounds onto the surface of the optical article and to limit the formation of siloxane prepolymers before grafting. That is the reason why the deposited organosilane compound thickness is so thin.

It is therefore recommended to apply the composition relatively quickly after the hydrolysis, typically within less than 2 hours, preferably less than 1 hour, more preferably less than 30 minutes after having performed the hydrolysis (by adding a typically HCl-based, acidic aqueous solution).

Most preferably, the composition is applied less than 10 minutes, even more preferably less than 5 minutes and preferably less than 1 minute after having performed the hydrolysis.

It is preferred to conduct the hydrolysis without supplying heat, i.e. typically at a temperature of from 20 to 25° C.

As a rule, the deposition of few nanometer-thick layers requires to use very diluted compositions, with a very low dry matter content, which slows down the condensation kinetics.

The organosilane compound used is capable, thanks to its silicon-containing reactive group, to establish a covalent bond with the silanol groups present onto the surface of the coating onto which it is deposited.

The organosilane compound of the invention comprises a polyoxyalkylene chain functionalized at only one end or at both ends thereof, preferably at only one end, by a group comprising at least one silicon atom carrying at least one hydrolyzable group. This organosilane compound comprises preferably a silicon atom carrying at least two hydrolyzable groups, preferably three hydrolyzable groups. Preferably, it does not comprise any urethane group. It is preferably a compound of formula:

$$R^1Y_mSi(X)_{3-m} \qquad (I)$$

wherein the groups Y, being the same or different, are monovalent organic groups bound to the silicon atom through a carbon atom, the groups X, being the same or different, are hydrolyzable groups, $R^1$ is a group comprising a polyoxyalkylene function, m is an integer equal to 0, 1 or 2. Preferably m=0.

The X groups are preferably selected from alkoxy groups —O—$R^3$, particularly $C_1$-$C_4$ alkoxy groups, acyloxy groups —O—C(O)$R^4$ where $R^4$ is an alkyl radical, preferably a $C_1$-$C_6$ alkyl radical, preferably a methyl or an ethyl, halogens such as Cl, Br and I or trimethylsilyloxy ($CH_3$)$_3$SiO—, and combinations of these groups. Preferably, the groups X are alkoxy groups, and particularly methoxy or ethoxy groups, and more preferably ethoxy groups.

The Y group, present when m is not zero, is preferably a saturated or unsaturated hydrocarbon group, preferably a $C_1$-$C_{10}$ and more preferably a $C_1$-$C_4$ group, for example an alkyl group, such as a methyl or an ethyl group, a vinyl group, an aryl group, for example an optionally substituted phenyl group, especially substituted by one or more $C_1$-$C_4$ alkyl groups. Preferably Y represents a methyl group.

In a preferred embodiment, the compound of formula I comprises a trialkoxysilyl group such as a triethoxysilyl or a trimethoxysilyl group.

The polyoxyalkylene group of the organosilane compound (group $R^1$) comprises preferably less than 80 carbon atoms, more preferably less than 60 carbon atoms, and even more preferably less than 50 carbon atoms. The group $R^1$ preferably satisfies the same conditions.

The group $R^1$ corresponds generally to the formula -L-$R^2$ where L is a divalent group bound to the silicon atom of the compounds of formula I or II through a carbon atom, and $R^2$ is a group comprising one polyoxyalkylene group bound to the group L through an oxygen atom, this oxygen atom being included in the group $R^2$. Non limiting examples of L groups include linear or branched, optionally substituted alkyl, cycloalkylene, arylene, carbonyl, amido groups, or combinations of these groups like cycloalkylenealkylene, biscycloalkylene, biscycloalkylenealkylene, arylenealkylene, bisphenylene, bisphenylenealkylene, amido alkylene groups, amongst which for example the group CONH($CH_2$)$_3$, or —O$CH_2$CH(OH)$CH_2$— and —NHC(O)— groups. Preferred groups L are alkyl groups (preferably linear), having preferably 10 carbon atoms or less, more preferably 5 carbon atoms or less, for example ethylene and propylene groups.

Preferred groups $R^2$ comprise a polyoxyethylene group —($CH_2CH_2O$)$_n$—, a polyoxypropylene group, or combinations of these groups.

The preferred organosilanes of formula I are compounds of following formula II:

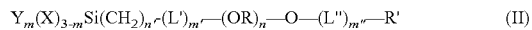
$$Y_m(X)_{3-m}Si(CH_2)_{n'}(L')_{m'}\text{—}(OR)_n\text{—}O\text{—}(L'')_{m''}\text{—}R' \qquad (II)$$

where R' is a hydrogen atom, a linear or branched acyl or alkyl group, optionally substituted by one or more functional groups, and which may furthermore comprise one or more double bonds, R is a linear or branched alkylene group, preferably linear, for example an ethylene or a propylene group, L' and L" are divalent groups, X, Y and m are such as defined hereabove, n' is an integer ranging from 1 to 10, preferably from 1 to 5, n is an integer ranging from 2 to 50, preferably from 5 to 30, more preferably from 5 to 15, m' is 0 or 1, preferably 0, m" is 0 or 1, preferably 0.

The groups L' and L", when present, may be selected from divalent groups L previously described and represent preferably the group —OCH$_2$CH(OH)CH$_2$— or the group —NHC(O)—. In this case, the groups —OCH$_2$CH(OH)CH$_2$— or —NHC(O)— are linked to the adjacent groups (CH$_2$)$_{n'}$ (with a group L') and R' (with a group L") through their oxygen atom (for the group —OCH$_2$CH(OH)CH$_2$—) or through their nitrogen atom (for the group —NHC(O)—).

In one embodiment, m=0 and the hydrolyzable groups X represent methoxy or ethoxy groups. n' is preferably 3. In another embodiment, R' represents an alkyl group possessing less than 5 carbon atoms, preferably a methyl group. R' may also represent an aliphatic or aromatic acyl group, especially an acetyl group.

Lastly, R' may represent a trialkoxysilylalkylene group or a trihalogenosilylalkylene group such as a group —(CH$_2$)$_{n''}$Si(R$^5$)$_3$ where R$^5$ is a hydrolyzable group such as the previously defined groups X and n" is an integer such as the previously defined n' integer. An example of such a group R' is the group —(CH$_2$)$_3$Si(OC$_2$H$_5$)$_3$. In this embodiment, the organosilane compound comprises two silicon atoms carrying at least one hydrolyzable group.

In preferred embodiments, n is 3, or does range from 6 to 9, from 9 to 12, from 21 to 24, or from 25 to 30, preferably from 6 to 9.

To be mentioned as suitable compounds of formula II are for example 2-[methoxy(polyethyleneoxy)propyl]trimethoxysilane compounds of formulas CH$_3$O—(CH$_2$CH$_2$O)$_{6-9}$—(CH$_2$)$_3$Si(OCH$_3$)$_3$ (III) and CH$_3$O—(CH$_2$CH$_2$O)$_{9-12}$—(CH$_2$)$_3$Si(OCH$_3$)$_3$ (IV), marketed by Gelest, Inc. or ABCR, the compound of formula CH$_3$O—(CH$_2$CH$_2$O)$_3$—(CH$_2$)$_3$Si(OCH$_3$)$_3$ (VIII), compounds of formula CH$_3$O—(CH$_2$CH$_2$O)$_n$—(CH$_2$)$_3$Si(OC$_2$H$_5$)$_3$ where n=21-24, 2-[methoxy(polyethyleneoxy)propyl]trichlorosilanes, 2-[acetoxy(polyethyleneoxy)propyl]trimethoxysilane of formula CH$_3$C(O)O—(CH$_2$CH$_2$O)$_{6-9}$—(CH$_2$)$_3$Si(OCH$_3$)$_3$, 2-[acetoxy(polyethyleneoxy)propyl]triethoxysilane of formula CH$_3$C(O)O—(CH$_2$CH$_2$O)$_{6-9}$—(CH$_2$)$_3$Si(OC$_2$H$_5$)$_3$, 2-[hydroxy(polyethyleneoxy)propyl]trimethoxysilane of formula HO—(CH$_2$CH$_2$O)$_{6-9}$—(CH$_2$)$_3$Si(OCH$_3$)$_3$, 2-[hydroxy(polyethyleneoxy)propyl]triethoxysilane of formula HO—(CH$_2$CH$_2$O)$_{6-9}$—(CH$_2$)$_3$Si(OC$_2$H$_5$)$_3$, compounds of formulas HO—(CH$_2$CH$_2$O)$_{8-12}$—(CH$_2$)$_3$Si(OCH$_3$)$_3$ and HO—(CH$_2$CH$_2$O)$_{8-12}$—(CH$_2$)$_3$Si(OC$_2$H$_5$)$_3$, polypropylene-bis[(3-methyldimethoxysilyl)propyl]oxide, and compounds with two siloxane heads such as polyethylene-bis[(3-triethoxysilylpropoxy)-2-hydroxypropoxy]oxide of formula (V), polyethylene-bis[(N,N'-triethoxysilylpropyl)-aminocarbonyl]oxide of formula (VI) with n=10-15 and polyethylene-bis(triethoxysilylpropyl)oxide of formula (VII):

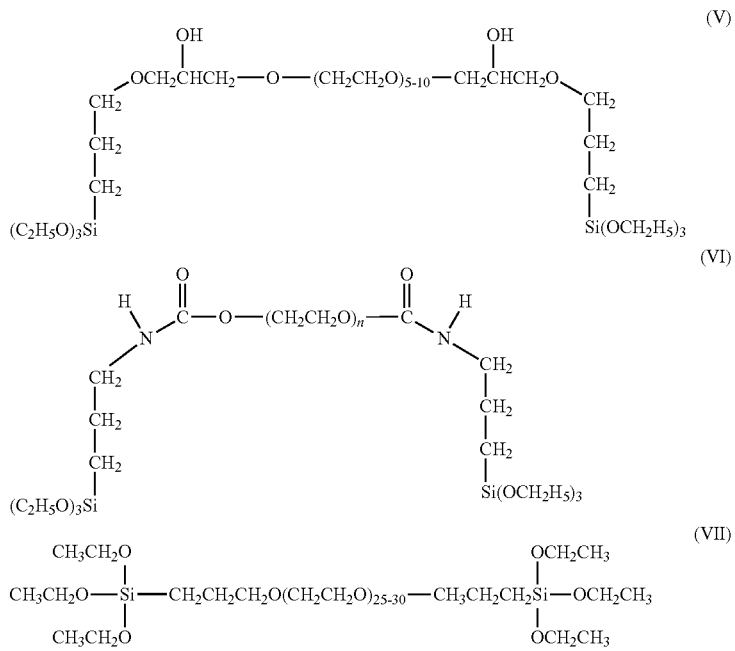

Preferred compounds of formula II are [alkoxy(polyalkylenoxy)alkyl]trialkoxysilanes or their trihalogenated analogues (m=m'=m"=0, R'=alkoxy).

Preferably, the organosilane compound of the invention has no fluorine atom. Typically, the fluorine weight ratio towards the anti-fog coating precursor coating is of less than 5%, preferably of less than 1% by weight and more preferably of 0%.

Preferably, the molecular weight of the organosilane compound according to the invention does range from 400 to 4000 g/mol, preferably from 400 to 1500 g/mol, more preferably from 400 to 1200 g/mol, and even more preferably from 400 to 1000 g/mol.

Of course it is possible to graft a mixture of compounds of formula I or II, for example a mixture of compounds with different polyoxyalkylene RO chain lengths.

In one embodiment of the invention, the anti-fog coating precursor comprises more than 80% by weight of an organosilane compound according to the invention, relative to the anti-fog coating precursor total weight, preferably more than 90%, more preferably more than 95% and most preferably more than 98%. In one embodiment, the anti-fog coating precursor consists in a layer of said organosilane compound.

Preferably, the anti-fog coating precursor of the invention comprises less than 5% by weight of a metal oxide or metalloid (for example silica or alumina) relative to the coating total weight, more preferably it is free of any. When the organosilane compound used for making the anti-fog coating is deposited under vacuum, preferably no metal oxide is co-evaporated, according to the coevaporation method of at least one organic compound and at least one inorganic compound described in the application EP 1324078.

Preferably, the anti-fog coating precursor coating does not comprise any crosslinking agent, which means that is preferably not formed from a composition comprising a crosslinking agent, for example tetraethoxysilane.

The anti-fog coating precursor of the invention has a static contact angle with water of more than 10° and of less than 50°, preferably lower than or equal to 45°, more preferably ≤40°, even more preferably 5 30° and most preferably ≤25°. This contact angle does preferably range from 15° to 40°, more preferably from 20° to 30°.

The deposition of the organosilane compound onto the surface of the coating comprising silanol groups may be carried out according to usual procedures, preferably by gas phase deposition or liquid phase deposition, most preferably in the gas phase, by evaporation under vacuum.

When the grafting is carried out in the gas phase, for example by evaporation under vacuum, it may be followed, if needed, with a step for removing the excess of the deposited organosilane compound so as to retain only the organosilane compound that is really grafted onto the surface of the silanol group-containing coating. Non grafted molecules are thus removed. Such a removal step should be especially performed when the thickness of the anti-fog coating precursor initially deposited is higher than 5 nm.

However this step for removing the organosilane compound in excess can be omitted in some cases, seeing that it is possible to deposit the organosilane compound so as to form a grafted layer, that is to say once it is ensured that the deposited thickness does not exceed a few nanometers. Adjusting the deposition parameters for obtaining such thicknesses belongs to the ordinary competence of any person skilled in the art.

Nevertheless, it is preferred to form the anti-fog coating precursor coating by depositing some organosilane compound in excess onto the surface of the coating comprising silanol groups and thereafter removing the excess of this deposited but not grafted compound. Indeed, the inventors observed that when a layer of grafted organosilane compound is directly formed with a thickness lower than or equal to 5 nm, which does not require any removal of organosilane compound in excess, it is sometimes possible to obtain a precursor coating of an antifog coating, the surface of which has not a sufficient affinity towards a liquid solution comprising at least one surfactant, which would lead to a coating not having the desired antifogging properties.

Surprisingly, this is not observed when the organosilane compound is deposited in excess, as previously indicated, and such excess is removed later on. The actual physical thickness of the organosilane compound layer deposited in excess is preferably lower than or equal to 20 nm.

Removing the organosilane compound deposited in excess may be performed by rinsing (wet process) using for example a soapy water-based solution and/or by wiping (dry process). Preferably, the removal step comprises a rinsing operation followed with a wiping operation.

Preferably, the rinsing operation is performed by cleaning the article with some soapy water (comprising a surfactant) using a sponge. Thereafter a rinsing operation is performed with deionized water, and optionally, the lens is thereafter submitted to a wiping operation for typically less than 20 seconds, preferably 5 to 20 seconds, by means of a CEMOI™ or Selvith™ cloth impregnated with alcohol, typically isopropyl alcohol. Another rinsing operation with deionized water may then be repeated, then a wiping operation with a wiping cloth. All these steps may be carried out manually or be partially or fully automated.

The step for removing the organosilane compound in excess leads to an organosilane compound layer having a thickness of 5 nm or less. The organosilane compound deposited onto the surface of the optical article therefore forms a monomolecular or a quasi-monomolecular layer.

The organosilane compound may be beforehand dissolved in a solvent prior to being evaporated, for better controlling the evaporation rate and the deposition rate. The thickness of the film may be controlled in this way thanks to this dissolution and by adjusting the amount of solution to be evaporated.

When the grafting is carried out using a wet process, for example by dipping or spin-coating, it is generally not necessary to perform a step for removing the organosilane compound deposited in excess.

The anti-fog coating precursor coating according to the invention has a low roughness. Typically, for an organosilane compound deposited by vapor phase, the roughness Ra is lower than 2 nm, typically of about 1 nm.

Ra (nm) is the roughness mean value of the measured surface:

$$Ra = \frac{1}{LxLy} \cdot \int_0^{Ly} \int_0^{Lx} |f(x, y)| \cdot dx \cdot dy$$

Lx and Ly are the sizes of the measured surface, f(x,y) is the surface in the central plane.

A temporary anti-fog coating according to the invention is obtained by depositing a film of a liquid solution comprising at least one surfactant onto the surface of the anti-fog coating precursor coating.

This solution provides the glass with an anti-fog temporary protection by creating on their surface an uniform layer that contributes to disperse the water droplets on the glass surface so that they do not form any visible fog.

Applying the surfactant solution may be performed by any known method, especially by dipping or spin-coating.

The surfactant solution is preferably applied by depositing a drop of this solution onto the surface of the anti-fog coating precursor, and then by spreading it so as to cover the whole precursor coating.

The surfactant solution applied is generally an aqueous solution, comprising preferably from 0.5 to 10%, more preferably from 2 to 8% by weight of a surfactant. A commercially available cleaning solution is advantageously used, which comprises a surfactant and comes as a spray or towelettes.

A broad diversity of surfactants may be used. These surfactants may be ionic (cationic, anionic or amphoteric) or non ionic surfactants, preferably non ionic or anionic surfactants. However, a mixture of surfactants belonging to these various categories may be envisaged. These surfactants for most of them are commercially available.

Preferably, a surfactant is used which comprises poly(oxyalkylene) groups.

Suitable examples of non ionic surfactants for use in the present invention include poly(alkylenoxy)alkyl-ethers, especially poly(ethylenoxy)alkyl-ethers, marketed for example by the ICI company under the trade name BRIJ®, poly(alkylenoxy)alkyl-amines, poly(alkylenoxy)alkyl-amides, polyethoxylated, polypropoxylated or polyglycerolated fatty alcohols, polyethoxylated, polypropoxylated or polyglycerolated fatty alpha-diols, polyethoxylated, polypropoxylated or polyglycerolated fatty alkylphenols and polyethoxylated, polypropoxylated or polyglycerolated fatty acids, all having a fatty chain comprising for example from 8 to 18 carbon atoms, where the number of ethylene oxide or propylene oxide units may especially range from 2 to 50 and where the number of glycerol moieties may especially range from 2 to 30, ethoxylated acetylene diols, compounds of the block copolymer type comprising at the same time hydrophilic and hydrophobic blocks (for example polyoxyethylene and polyoxypropylene blocks, respectively), copolymers of poly(oxyethylene) and poly(dimethylsiloxane) and surfactants incorporating a sorbitan group.

The preferred anionic surfactants are those comprising a sulfonic acid group, amongst which to be mentioned are the alkylsulfosuccinates, alkylethersulfosuccinates, alkylamidesulfosuccinates, alkylsulfosuccinamates, dibasic salts of polyoxyethylene alkyl sulfosuccinic acid, dibasic salts of alkyl sulfosuccinic acid, alkylsulfo-acetates, sulfosuccinic acid hemi-ester salts, alkylsulfates and aryl sulfates such as sodium dodecylbenzene sulfonate and sodium dodecylsulfate, ethoxylated fatty alcohol sulfates, alkylethersulfates, alkylamidoethersulfates, alkylarylpolyethersulfates, alkylsulfonates, alkylphosphates, alkyletherphosphates, alkylamidesulfonates, alkylarylsulfonates, α-olefin-sulfonates, secondary alcohol ethoxysulfates, polyoxyalkylated carboxylic acid ethers, monoglyceride sulfates, sulfuric acid polyoxyethylene alkylether salts, sulfuric acid ester salts, N-acyltaurates such as N-acylmethyltaurine salts, monosulfonic acid hydroxyalkanes salts or alkene monosulfonates, the alkyl or acyl radical of all these compounds comprising preferably from 12 to 20 carbon atoms and the optional oxyalkylene group of these compounds comprising preferably from 2 to 50 monomer units. These anionic surfactants and many others to be suitably used in the present application are described in the application EP 1418211 and in the patent U.S. Pat. No. 5,997,621.

Suitable examples of cationic surfactants for use in the present invention include primary, secondary or tertiary fatty amine salts, optionally polyoxyalkylenated, quaternary ammonium salts such as tetraalkylammonium, alkylamidoalkyltrialkylammonium, trialkylbenzylammonium, trialkylhydroxyalkyl-ammonium or alkylpyridinium chlorides or bromides, imidazoline derivatives or amine oxides of cationic nature.

In one embodiment, the surfactant used comprises a fluorinated surfactant. In this case, those will be preferably used which comprise at least one fluoroalkyl or polyfluoroalkyl group and more preferably those which comprise at least one perfluoroalkyl group.

The Clarity Defog It® solution from the Nanofilm company is a surfactant solution commercially available which provides the antifogging property.

Instead of a surfactant solution, it is possible to use hydrophilic compounds, more particularly compounds having no surface active properties comprising at least one hydrophilic group, preferably a poly(oxyalkylene) group, but surfactant solutions are preferred and give much better anti-fog results than solutions based on non surfactant hydrophilic compounds. The anti-fog coating of the invention preferably has a static contact angle with water lower than or equal to 10°, more preferably lower than or equal to 5°.

An immediately operational anti-fog coating is obtained as soon as the surfactant composition is applied, which represents one of the major advantages of the invention. Thus, it is not necessary to apply many times a surfactant solution to score the antifogging effect, as is the case with products of the prior art.

In addition, the antifogging effect provided by the anti-fog coating is long-lasting over time, since it lasts for a time period ranging from several days up to several weeks, which is a significant improvement as compared to the known anti-fog coatings. This durability is tested with mechanical stresses corresponding to repeated wiping operations, in a procedure described in the experimental section.

The anti-fog coating is temporary but easily renewable, since it just has to be performed a new application of surfactant when there are not sufficient surfactant molecules adsorbed onto the surface of the anti-fog coating precursor anymore. The latter therefore remains "activable" in all circumstances.

The optical article according to the invention has no antifouling coating, particularly no antifouling coating based on fluorinated silanes, yet it reveals to have a satisfying cleanability. Its ease of sebum trace removal is not as good as that of a fluorinated antifouling coating but is better than that of a bare antireflective coating, that is to say free of any antifouling coating.

However, the ease of application of temporary anti-fog products onto the anti-fog coating precursor according to the invention is better than on the fluorinated antifouling coatings that are generally used. Moreover, the durability of the antifouling effect obtained thanks to a temporary anti-fog product is longer in the context of the invention than when this anti-fog product is applied onto an antifouling coating.

The present invention further relates to a method for making an optical article, preferably a lens for spectacles, such as defined hereabove, comprising the steps of:
a) providing a substrate provided with a coating comprising silanol groups on the surface thereof,
b) depositing onto said coating, preferably by evaporation under vacuum, at least one organosilane compound possessing a polyoxyalkylene group and at least one silicon atom carrying at least one hydrolyzable group, so as to obtain a layer of grafted organosilane compound having a thickness lower than or equal to 5 nm, by optionally removing the excess of organosilane compound that has been deposited but not grafted onto the surface of the coating comprising silanol groups, so as to obtain a static contact angle with water of more than 10° and of less than 50°.

This method may furthermore comprise an additional step for depositing a film of a liquid solution comprising at least one surfactant onto the surface of the layer formed at step b), thus giving access to an anti-fog coating.

Preferably, the anti-fog coating precursor coating is not submitted to an extended heating prior to applying said liquid solution comprising at least one surfactant. Heating the precursor coating at 50-60° C. for several hours could damage the optical article. Moreover, upon depositing the anti-fog coating precursor, it is not necessary to heat the optical article.

The present invention lastly relates to an optical article, preferably a lens for spectacles, comprising a substrate provided with a coating comprising silanol groups on the surface thereof, a part of the surface of said coating comprising silanol groups on the surface thereof directly contacting an anti-fog coating precursor coating such as previously defined, and another part of the surface of said coating comprising silanol groups on the surface thereof, preferably the remainder of its surface, being in direct contact with, and adhering to a hydrophobic and/or oleophobic coating. These parts may be continuous or discontinuous.

Such an optical article can especially be used as a demonstrator for showing anti-fogging properties, after application on the surface thereof of a liquid solution comprising at least one surfactant and/or one hydrophilic compound with no surface active properties such as previously defined, then by submitting the article to fog generating conditions (breath, refrigerator, boiling water vapor . . . ) or by submitting its surface to one or more wiping operations before being exposed to fog generating conditions.

The optical article mists on that part of the surface covered with the hydrophobic and/or oleophobic coating and remains transparent in the area comprising the anti-fog coating.

The hydrophobic and/or oleophobic coatings, or antifouling top-coats that can be suitably used in this optical article are especially described in the application WO 2010/055261. They differ naturally from the anti-fog coatings of the invention.

The hydrophobic and/or oleophobic coatings used preferably have a surface energy lower than or equal to 14 mJ/m$^2$, preferably lower than or equal to 12 mJ/m$^2$, in accordance with the Owens Wendt method described in the article referred to in the application WO2010/055261.

Although the present invention is not limited to this method, such an optical article may be formed by using an optical article provided with a coating comprising silanol groups on the surface thereof, at least one part of the surface of said coating being directly coated with a hydrophobic and/or oleophobic coating, by submitting at least one part of this hydrophobic and/or oleophobic coating to a removing treatment, in order to lay bare the underlying coating comprising silanol groups on the surface thereof, then by depositing onto the thus laid bared surface at least one organosilane compound according to the invention, so as to form an anti-fog coating precursor coating such as previously described.

Any chemical or physical means to remove part of the hydrophobic and/or oleophobic coating may be used. It will be preferred to bombard the coating with argon ions by means of an ion gun, but a plasma-mediated treatment under vacuum, a corona discharge, an electron beam bombardment or an ultraviolet treatment may also be suitably employed, under conditions that will be easily determined by any person skilled in the art. If the optical article comprises an electrically conductive layer, especially a conductive layer providing antistatic properties in an antireflective coating, an ion bombardment will be preferably used to avoid any damage to the article. To limit the removing treatment to just one part of the hydrophobic and/or oleophobic coating, a protecting means can be used such as a mask or any other suitable method, placed on the surface of the article to be treated or optionally interleaved between the source and the surface to be treated in the event of energetic species-mediated treatments such as with ions, photons or electrons.

Using masks in optics is usual, and is especially described in the patent U.S. Pat. No. 5,792,537.

As an alternative, the previously mentioned optical article may be manufactured from a lens coated with a coating according to the invention, the surface comprising silanol groups of which being partially laid bare according to the previously described method, and then a hydrophobic and/or oleophobic coating is deposited onto said laid bare surface.

The following examples illustrate the invention in a more detailed yet non-limiting way.

EXAMPLES

1. Materials and Optical Articles Used

Silica is used in the form of granules provided by the Optron Inc. company. The organosilane compound used in the examples to form the anti-fog coating precursor is 2-[methoxy(polyethyleneoxy)propyl]trimethoxysilane comprising from 6 to 9 ethylene oxide units (examples 1-4,6,7), of formula (III) and with a molecular weight 450-600 g/mol (CAS No.: 65994-07-2. Ref: SIM6492.7, provided by the Gelest, Inc. company), or 2-[methoxy(polyethyleneoxy)propyl]trimethoxysilane comprising 3 ethylene oxide units (example 5), of formula (VIII).

The comparative organosilane compounds used in comparative examples C4 to C7 are 2-[methoxy(polyethyleneoxy)propyl]triethoxysilane comprising 45 ethylene oxide units, of formula $CH_3O-(CH_2CH_2O)_{45}-(CH_2)_3Si(OC_2H_5)_3$ (IX), provided by the Interchim company, or compound $HO(CH_2CH_2O)_{45}CONH(CH_2)_3Si(OCH_2CH_3)_3$ (X), provided by the ABCR company (CAS No.: 37251-86-8). The compound of formula (X) is the compound used in comparative example 3 of the application JP 2005-281143.

Unless otherwise specified, the lenses used in the examples of the invention comprise a lens substrate in plane polythiourethane (thermosetting PTU marketed by Mitsui Toatsu Chemicals), with a refractive index of 1.60, 65 mm diameter, power −2.00 dioptries and thickness 1.2 mm.

These glasses are treated on both faces according to the methods described hereafter, the concave face being treated before the convex face.

This substrate is coated with an abrasion-resistant and scratch-resistant coating with a refractive index of 1.60, as well as with a monolayer antireflective coating of about 100 nm thickness and with a refractive index of 1.40, obtained through a sol-gel method (noted antireflective coating X) (obtained by depositing a composition based on alkoxysilane comprising hollow colloidal particles, heated after deposition for 3 hours at 100° C.), or with a four-layer commercial antireflective coating $ZrO_2/SiO_2/ZrO_2/SiO_2$ (noted antireflective coating Z) deposited onto the abrasion-resistant coating by evaporation under vacuum of the materials in the order in which they are mentioned (respective thicknesses of the layers: 27, 21, 80 and 81 nm).

Prior to depositing the anti-fog coating precursor, the lenses comprising the antireflective coating X are submitted to a plasma-assisted surface activating treatment (0.2 mBar, 200 mL $O_2$/min, 2 min at 500 W then 5 min at 0 W).

The lenses comprising the antireflective coating Z are not submitted to any activating treatment.

In examples 4-6, the lens used comprises a lens substrate in an ORMA® material, comprising a polyurethane-based impact-resistant primer with a thickness of about 1 micron, itself provided with an abrasion-resistant coating with a thickness of about 3 microns by depositing and curing a composition such as defined in example 3 of the patent EP 614957, coated in turn (except example 4) with a five-layer antireflective coating $ZrO_2/SiO_2/ZrO_2/ITO/SiO_2$ (noted antireflective coating Y) deposited onto the abrasion-resistant coating by evaporation under vacuum of the materials in the order in which they are mentioned (respective thicknesses of the layers: 29, 23, 68, 7 and 85 nm). An ITO layer is an electrically conductive layer of indium oxide doped with tin ($In_2O_3$:Sn).

Prior to depositing the anti-fog coating precursor, the lenses comprising the abrasion-resistant coating are submitted to a surface activating treatment, which consists in performing an ion bombardment with a rare gas or oxygen, in the present case a rare gas which is argon, under vacuum, at a pressure typically of $3.5.10^{-5}$ mbar.

In the examples, the antireflective coating is not submitted to any activating treatment prior to depositing the anti-fog coating precursor.

The anti-fog coating precursor has been deposited according to two different methods:

2. Preparation of Anti-fog Coating Precursors a) Deposition of the Anti-fog Coating Precursor Using a Wet Process

Example 1

1 g of siloxane compound of formula III is diluted in 9 g of isopropanol. 4 g of the resulting solution are thereafter diluted in 145 g of isopropanol. The solution is stirred for 2 minutes at room temperature then slightly acidified by adding 0.2 g of HCl 0.1 N and lastly deposited by spin-coating (3000 rpm/30 sec/acceleration: 2000 rpm/s; 50% humidity) on the antireflective coating X of a lens, the surface of which has been activated as indicated hereinabove. The anti-fog coating precursor is thereafter heated for 15 min at 75° C. then for 3 h at 100° C. At the end of this step, its thickness, evaluated through an ellipsometric analysis, is from 3 to 5 nm. Since the siloxane compound of formula III has not been deposited in excess, no removing step by wiping or washing has been performed.

b) Vapor Phase Deposition of the Anti-fog Coating Precursor

Examples 2-6

In example 2, the deposition is carried out on the antireflective coating Z of a lens by evaporation under vacuum using a Joule effect-based heating source. 150 μL of siloxane compound of formula III are impregnated in a nickel foam within a copper capsule (deposition thickness: 10 nm, deposition rate: 0.25 nm/s, pressure when deposition starts: $2.10^{-5}$ mBar).

Once the evaporation is completed, the surface of each lens is wiped with a Cémoi™ dry cloth until the excess of siloxane compound of formula III deposited be removed. A homogeneous coating is then obtained. The anti-fog coating of example 2 has a thickness of 1-3 nm.

The Cémoi™ cloth is a cloth provided by the Facol supplier under the reference Microfibre M8405 30×40.

In example 4, the deposition is carried out on the abrasion-resistant coating of a lens by evaporation under vacuum by using a Joule effect-based heating source. The siloxane compound of formula III is poured in a copper capsule (in the absence of any porous material), and this capsule is deposited onto a heating support in conductive tantalum. The evaporating device is a SATIS 1200 DLF apparatus. The evaporation pressure of the siloxane compound of formula III does generally vary from $5.10^{-6}$ to $8.10^{-6}$ mbar. Once the evaporation is completed, the surface of each lens is rinsed with some soapy water, optionally isopropyl alcohol, then deionized water and wiped with a Cémoi™ dry cloth so that the excess of siloxane compound of formula III deposited be removed.

In the examples 5-6, the deposition is carried out on the antireflective coating Y of a lens by evaporation under vacuum according to a protocol similar to that of example 4, by using an organosilane of formula III or VIII, with a programmed evaporation rate of 0.3 nm/s. A layer of about 12 nm thickness is obtained (before removal of the siloxane compound in excess), which is optionally heated for 1 h at 60° C. (only for examples C6 and C7). The siloxane compound excess is thereafter removed as described in example 4.

c) Comparative Examples

The lenses of comparative example C1 differ from those of example 1 in that they do not comprise any anti-fog coating precursor.

The lenses of comparative example C2 differ from those of example 2 in that they do not comprise any anti-fog coating precursor.

The lenses of comparative example C3 differ from those of comparative example C2 in that a 2-3 nm-thick antifouling coating is formed on the antireflective coating by evaporation under vacuum from the composition OPTOOL DSX®, marketed by Daikin Industries (fluorinated resin comprising perfluoropropylene groups corresponding to the formula given in the patent U.S. Pat. No. 6,183,872).

The lenses of comparative examples C4 to C7 possess an anti-fog coating precursor coating formed from an organosilane compound that is not according to the present invention, because of a polyoxyalkylene group comprising more than 80 carbon atoms.

d) Deposition of a Surfactant-containing Liquid Solution (temporary anti-fog solution)

The articles of examples 1A, 2A, C1A-C7A, 4A, 5An and 6A have been obtained by applying respectively onto the surface of the articles of examples 1, 2, C1-C3 and 4 only once the solution Clarity® Defog It, comprising surfactants (polyethylene glycols, in solution in isopropanol), marketed by the Nanofilm company, simply referred to as "Defog It" hereunder. It may be applied onto the lenses using a wipe of trademark "Defog It" comprising this solution, or by directly spreading the anti-fog liquid of trademark "Defog It".

e) Tests and Results

The performances of the optical articles prepared and their constitution are summarized in tables 1, 2 and in the paragraphs hereunder.

TABLE 1

| | Example | | | | |
|---|---|---|---|---|---|
| | 1/1A | 2/2A | C1/C1A | C2/C2A | C3/C3A |
| Antireflective coating | X | Z | X | Z | Z |
| Anti-fog coating precursor | Yes | Yes | No | No | No |
| Deposition method for the anti-fog coating precursor | Wet process | Evaporation | — | — | — |
| Antifouling coating | No | No | No | No | Yes |
| Static contact angle with water (°) before application of Defog it | 25 (ex. 1) | 25 (ex. 2) | 102 (C1) | 42 (C2) | 118 (C3) |
| Cleanability (score/10) before application of Defog it | 5 (ex. 1) | 3 (ex. 2) | 0 (C1) | 2 (C2) | 9 (C3) |
| Breath test | N (ex. 1, 1A) | N (ex. 2. 2A) | Yes(C1) N(C1A) | Yes(C2) N(C2A) | Yes(C3) N(C3A) |

TABLE 1-continued

| | Example | | | | |
|---|---|---|---|---|---|
| | 1/1A | 2/2A | C1/C1A | C2/C2A | C3/C3A |
| Durability over time of the antifogging effect after application of the solution Defog It | >15 days | >15 days | <3 days | <24 h | <24 h |
| Application efficiency of the wipe Defog It (number of applications*) | 1 | 1 | 3 | >5 | 5 |
| Application efficiency of the solution Defog It (number of applications*) | 1 | 1 | >3 | >3 | >3 |
| Refrigerator test | 1A(0) | 2A(0) | | C2(2) | |
| Hot vapor Test | 2A(0) | 2A(0) | C1(2) C1A(2) | C2(2) C2A(2) | |

*From the lens comprising the anti-fog coating precursor (with no previous application of Defog it onto it).

The lenses of example 4A have antifogging properties comparable to those of examples 1A and 2A.

e1) Evaluation of The Antifogging Properties

The antifogging properties may be evaluated according to three methods: the "breath test" (qualitative test which does not use any visual acuity measurement), the "hot vapor test" and the "refrigerator test". The breath and the refrigerator tests are considered as generating a low fog stress. The hot vapor test is considered as generating a high fog stress.

Breath Test

For this test, the tester places the lens to be evaluated at a distance of about 2 cm from his mouth. The tester for 3 seconds blows his breath onto the exposed surface of the glass. The tester can visually observe the presence or the absence of a condensation haze/distortion.
  Yes. Presence of fog
  No. Absence of fog: such a lens is considered as having antifogging properties at the end of the breath test, that is to say it inhibits the haze effect resulting from the fog (but it does not necessarily represent an anti-fog glass within the meaning of the invention, because it may present a visual distortion leading to a visual acuity <6/10 only).

Hot Vapor Test

Before the test, the glasses are placed for 24 hours in a temperature-regulated environment (20-25° C.) and under 50% humidity.

For the test, the glasses are placed for 15 seconds above a heated container comprising water at 55° C. Immediately after, a visual acuity scale located at a distance of 5 m is observed through the tested glass. The observer evaluates the visual acuity as a function of time and according to following criteria:
  0. No fog, no visual distortion (visual acuity=10/10)
  1. Fog and/or visual distortion allowing a visual acuity >6/10
  2. Fog and/or visual distortion allowing a visual acuity <6/10

In practical terms, to obtain the score 0 or 1, a wearer having a vision of 10/10 and having placed the glass in front of his eye should be able to distinguish the orientation of the "E" letters on the 6/10 line of the Snellen optotype table placed at a distance of 5 meters.

This test makes it possible to simulate the ordinary living conditions where a wearer leans his face towards a cup of tea/coffee or towards a pan filled with boiling water.

Refrigerator Test

For this test, the lenses are placed in sealed boxes containing a dessicant (silica gel). The boxes in turn are placed at least for 24 h in a refrigerator at 4° C. After this time period, the boxes are withdrawn from the refrigerator and the glasses immediately tested. They are then placed in a 45-50% humidity atmosphere and at 20-25° C. A visual acuity scale located at a distance of 4 m is observed through the glass. The observer evaluates the visual acuity as a function of time and according to the same criteria as the hot vapor test (scores 0, 1 or 2).

This test makes it possible to simulate the ordinary living conditions where a wearer leaves a cold and dry place and enters a hot and damp room.

Results of the Tests for Evaluating the Anti-Fogging Properties

The results of the hot vapor test are given on FIG. 1. It can be observed that only the glasses of examples 1A and 2A represent anti-fog glasses within the meaning of the invention. In addition they are immediately operational. The glasses which are devoid of any hydrophilic surface coating (examples C2 and C3) and the glasses provided with an anti-fog coating precursor coating do not represent anti-fog glasses within the meaning of the invention, because they create a visual distortion not allowing to reach a visual acuity >6/10 after having been exposed to hot vapor. However, the glasses of examples 1 and 2 have antifogging properties in the context of the breath test.

All the non anti-fog glasses end up after a while leading to a visual acuity of 10/10, once the water vapor has evaporated.

e2) Evaluation of The Ease of Soil Removal Properties (Cleanability)

The ease of soil removal (cleanability) of a lens surface, without depositing a surfactant-containing liquid solution has been evaluated by depositing onto the surface of the glass a finger mark by means of a stencil and by wiping this mark with a cloth ref. TWILLX 1622. The glasses are observed on a black background and classified by the tester from the easiest to clean to the less easy to clean. With this classification is associated a score given by the tester ranging from 0, hard to clean to 10, very easy to clean. This test makes it possible to simulate the ordinary living conditions where a wearer cleans with a wiping cloth the finger marks that are present on his glasses.

The tested glasses and the results are given in table 1 and demonstrate that the glass which is the easiest to clean is naturally the one provided with a fluorinated antifouling coating (example C3). The glasses comprising an anti-fog coating precursor according to the invention (examples 1 and 2) are easier to clean than those which do not have any, or similar to those (examples C1 and C2), having an uncoated antireflective coating.

e3) Evaluation of the Application Efficiency of Anti-fog Temporary Products

Successive depositions of a temporary anti-fog product (solution or wipe) are conducted on the tested glasses (Ex 1, 2, 4, C1, C2, C3) until neither fog nor distortion is generated with the hot vapor test described hereabove (perfect anti-fog effect). The expected effect is a performance level leading to a glass showing neither fog nor distortion. The number of applications that are required for reaching such a performance level is given in table 1.

Use of the wipe Defog It: The glasses are wiped with the wipe by performing a spiral movement from the center to the periphery with the wipe Defog It onto each face. This corresponds to one application. The number of applications has been limited to 5.

Use of the solution Defog It: Two drops of the solution Defog It are deposited onto each face of the glass and are wiped by performing a spiral movement from the center to the periphery with a wiping cloth Cémoi™. This corresponds to one application. The number of applications has been limited to 3.

The results are given in table 1 and enable to point out that a unique application of temporary anti-fog product is required on an anti-fog coating precursor coating according to the invention to obtain an anti-fog coating, which simplifies the use of temporary anti-fog solutions. The other surfaces require several applications of the anti-fog solution to possibly expect to reach the same anti-fog performance level. Thanks to the present invention, the surface of the coating comprising silanol groups has somehow been made compatible with a surfactant thanks to the grafting of an organosilane compound according to the invention.

The inventors think that such ease of application does not only result from the hydrophilic properties of the surfaces of the anti-fog coating precursors, but also from the chemical nature of the organosilane compound of formula III.

e4) Durability of the Antifogging Effect after a Mechanical Stress (after Application of the solution Defog It)

The durability towards mechanical stress (wiping) of the antifogging effect gained by a temporary anti-fog solution applied using a wipe Defog It has been evaluated as follows.

The deposition of the temporary anti-fog solution is carried out as many times as necessary so that, at the initial moment, all the lenses can be considered as anti-fog lenses at the end of the hot vapor test described hereabove. The lenses are thereafter wiped with a wiping cloth Cémoi™ and again submitted to the hot vapor test. (The glasses are wiped when the water film caused by the fog has disappeared. If the glasses are wiped while the water film is still present, the anti-fog solution is partially taken off).

A wiping operation corresponds to two very marked rotations of a wiping cloth Cémoi™ on the surface of the lens. The scores (0, 1 or 2) correspond to the fog level at the end of the second hot vapor test, after the corresponding number of wiping operations.

The durability test results are given in table 2.

| Number of wiping operations | Example 1 Anti-fog score | Example C1 Anti-fog score | Example C3 Anti-fog score |
|---|---|---|---|
| 1 | 0 | 0 | 2 |
| 2 | 0 | 0 | |
| 3 | 0 | 0 | |
| 4 | 0 | 0 | |
| 5 | 0 | 1 | |
| 6 | 0 | 2 | |
| 10 | 1 | | |

On a hydrophobic surface (example C3), one wiping operation is sufficient to completely alter the antifogging properties provided by the temporary solution Defog It.

On a more hydrophilic surface (surface of the antireflective coating of example C1), 5 wiping operations are required for seeing a beginning of deterioration of the antifogging properties provided by the temporary solution Defog It.

On the surface of an anti-fog coating according to the invention, 10 wiping operations are required for seeing a beginning of deterioration of the antifogging properties provided by the temporary solution Defog It.

An anti-fog coating according to the invention enables therefore to significantly improve the durability of the antifogging property provided by a temporary anti-fog solution towards a mechanical wiping operation.

e5) Durability Over Time of the Antifogging Effect (after Application of the Defog It Solution)

The durability over time of the antifogging effect after deposition of the temporary solution Defog It has been evaluated, this time with no mechanical stress on the glass after deposition. The glass is stored at room temperature and humidity (~20-25° C., relative humidity ~30%). The deposition of the anti-fog solution is carried out as many times as necessary so that, at the initial moment, all the glasses can be considered as anti-fog glasses at the end of the breath test. The evolution of the antifogging effect is then regularly tested through the breath test. Table 1 gives the time after application of the anti-fog solution after which the glass is not considered as having antifogging properties anymore at the end of the breath test. The tests have been stopped after 15 days.

It could be noticed that the surfaces of the anti-fog coating precursors according to the invention lead to a durability of the antifogging effect provided by the temporary solution longer than 15 days, which is much better than the other tested surfaces. The inventors think that this durability does not only result from the hydrophilic properties of the surfaces of the anti-fog coating precursors, but also from the chemical nature of the organosilane compound of formula III.

e6) Contact Angle of the Anti-fog Coating Precursor Coating (Tables 1 and 4)

The measurements are conducted on a Digidrop goniometer from the GBX company, from samples onto which the deposited organosilane compound in excess has been removed. 4 μL of water are automatically deposited on the surface of the sample to be analyzed, then the contact angle is measured. The results are given in table 1.

e7) Antireflective Properties

The glass reflection spectra have been examined before and after deposition of the temporary solution Defog It. Each of the lenses has antifogging properties at the end of the breath test after application of this solution.

Table 3 hereunder shows the variations observed over the reflection spectra after deposition of the temporary solution Defog It.

| Example | Rv % Before deposition of the solution Defog it | Rv % after deposition of the solution Defog it | ΔRv % |
|---|---|---|---|
| 1/1A | 1.45 | 1.92 | 0.47 |
| 2/2A | 0.72 | 0.44 | −0.28 |
| C2/C2A | 0.77 | 0.48 | −0.29 |
| C3/C3A | 0.50 | 0.46 | −0.04 |

The articles resulting from a modification of their surface through grafting of the organosilane of formula III (before deposition of the surface active solution) retain antireflective properties corresponding to the ophthalmic industry criteria.

In addition, all the tested glasses retain their antireflective properties after deposition of the temporary anti-fog solution.

4. Example 3

In this example, a silicon substrate (wafer) has been used instead of a lens so as to more precisely measure the thickness of the deposited layers.

The optical article used in this example comprises a silicon substrate coated with a silica-based layer of 50 nm thickness applied by vapor deposition (programmed thickness: 140 nm, programmed deposition rate: 3 nm/s). This silica-based layer has 3 days after the deposition a static contact angle with water of 33°, evoluting up to 43° within 2-3 monts.

The anti-fog coating precursor is deposited onto this silica-based layer by chemical vapor deposition of the siloxane compound of formula III in the same conditions as in example 2, which leads, before removal of the excess of organosilane compound, to a 10 nm-thick layer having at t=3 days a static contact angle with water of 10°.

Once the evaporation is completed, the surface of the article is washed with some soapy water and wiped with a Cémoi™ dry cloth. A coating is then obtained, having a thickness of 1-3 nm and a homogeneous surface, and having a static contact angle with water of 39°.

After application of a temporary solution "Defog It" comprising a surfactant, an anti-fog coating is obtained, having a static contact angle with water of less than 5°.

The durability of the anti-fog coating has been evaluated by performing 50 dry wiping operations of the surface of the optical article by means of a wiping cloth Cémoi (50 back and forth motions). After this operation, the article has a static contact angle with water of less than 3°, which demonstrates that the temporary solution "Defog It" is still present on the surface thereof.

In this example, the thicknesses have been analyzed through mono-wavelength ellipsometry considering that the global refractive index for the silica/anti-fog coating precursor bilayer is of 1.45.

5. Examples 5-6 and Comparative Examples C4-C7

Tests and Results

The performances of the optical articles prepared in these examples and their constitution are summarized in table 4 and in the paragraphs hereunder.

TABLE 4

| Example | 5/5A | 6/6A | C4/C4A | C5/C5A | C6/C6A | C7/C7A |
|---|---|---|---|---|---|---|
| Antireflective coating | Y | Y | Y | Y | Y | Y |
| Anti-fog coating precursor | Yes Compound VIII | Yes Compound III | Yes Compound IX | Yes Compound X | Yes Compound IX | Yes Compound X |
| Deposition method for the anti-fog coating precursor | Evaporation | Evaporation | Evaporation | Evaporation | Evaporation | Evaporation |
| Drying for 1 h at 60° C. of the anti-fog coating precursor | No | No | No | No | Yes | Yes |
| Antifouling coating | No | No | No | No | No | No |
| Static contact angle with water (°) before application of Defog it | 41 (ex. 5) | 36 (ex. 6) | 34 (ex. C4) | 31 (ex. C5) | 32 (ex. C6) | 29 (ex. C7) |
| Anti-fog score after 0 wiping operation* | A | A | A | A | A | A |
| Anti-fog score after 2 wiping operations* | A | A | A | C | C | B |
| Anti-fog score after 5 wiping operations* | A | A | B | C | C | B or C |
| Anti-fog score after 10 wiping operations* | A or C | A | C | C | C | C |
| Anti-fog score after 20 wiping operations* | C | B | C | C | C | C |

*From the glass comprising the anti-fog coating (after application of the surfactant). The number of wiping operations indicated is a cumulated number.

Durability of the Antifogging Effect after a Mechanical Stress (after Application of the Solution Defog It)

This test enables to evaluate the resistance to wiping of the temporary anti-fog solution onto the surface of the lenses. It is carried out on two samples of each lens.

The deposition of the temporary anti-fog solution has been carried out so that, at the initial moment, all the lenses can be considered as anti-fog glasses at the end of the hot vapor test described hereabove.

After each hot vapor test, the lenses should be dried at room temperature, so that the water film due to the fog has disappeared. Indeed, if the glasses are wiped while the water film is still present, the anti-fog solution is partially taken off.

The lenses are thereafter dry wiped by hand with a wiping cloth Cémoi™ (2 wiping operations) and for the second time submitted to the hot vapor test, then dried as previously described. A wiping operation corresponds to two very marked rotations of a wiping cloth Cémoi™ on the surface of the lens.

The lenses are thereafter dry wiped by hand with a wiping cloth Cémoi™ (3 additional wiping operations) and for the third time submitted to the hot vapor test, enabling to allocate an anti-fog score after 5 wiping operations, then dried as previously described. This cycle is repeated so as to be able to allocate an anti-fog score after 10 and 20 cumulated wiping operations, by performing a series of 5, then a series of 10 additional wiping operations, with a drying step therebetween.

The anti-fog scores (A, B, C or D) correspond to the fog level at the end of each hot vapor test, after implementation of the corresponding number of wiping operations (cumulated number):

A: Homogeneous water film (acuity 10/10)
B: Visual distortion considered as acceptable by the wearer
C: Visual distortion considered as not acceptable by the wearer (heterogeneous water film)
D: Totally diffusing white haze, fine water drops.

The lenses are considered as having successfully passed the durability test if they obtained a score A or B.

Results

It clearly appears that the organosilane compounds of the invention, corresponding to formulas III and VIII, enable to form anti-fog coatings that are more efficient than the comparative compounds of formulas IX and X used in the prior art, which possess a too long polyoxyalkylene chain. This result is surprising, given that compounds IX and X enable to form more hydrophilic coatings than compounds III and VIII, and that better antifogging properties are generally expected when increasing the hydrophilic character of a coating. Compound III is moreover appreciably more efficient than compound VIII.

Moreover, the thermal post-treatment at 60° C. during one hour, such as carried out in comparative examples C6 and C7, in accordance with the teachings of the application JP 2005-281143, has not much influence on the performances of the anti-fog coating.

6. Example 7

A glass made of an ORMA® material and comprising on its concave and convex faces the same functional coatings as those of examples 5-6, that is to say a polyurethane-based impact-resistant primer, an abrasion-resistant coating and the antireflective coating Y ($ZrO_2/SiO_2/ZrO_2/ITO/SiO_2$) is coated by evaporation under vacuum on both faces thereof with a 2 nm-thick layer of antifouling coating based on the Optool DSX® material marketed by the Daikin Industries company.

A mask, made by a laser cut process of a plastic film so as to form a pattern therein, is then arranged on its convex face. The convex face, partially protected through the mask, is thereafter submitted to an argon ion bombardment using an ion gun, which causes the antifouling coating to be removed in the area that was not protected by the mask, with the form of the pattern, and in this area the outer layer of the antireflective coating Y—which is a silica-based layer—to become exposed.

Thereafter, in the exposed area, the vapor phase deposition of the anti-fog coating precursor is carried out in the same way as for examples 5-6, by using the organosilane of formula III, and by fixing the mask to the surface of the lens for the deposition, so as to form a 2 to 3 nm thick-layer grafted with an anti-fog coating precursor coating.

To demonstrate the antifogging properties of the glass, a few drops of the Clarity® Defog It solution are applied on their convex surface, then this surface is wiped with a wiping cloth Cémoi™. After a number of wiping operations, the surfactant solution has been completely removed from the surface of the glass coated with the antifouling coating, while it is still present in the area corresponding to the pattern.

This may be visually verified by submitting the thus prepared glass to the breath test, to the refrigerator test or to the hot vapor test, fog appearing on the whole surface of the glass except in the area corresponding to the pattern, which is coated with an anti-fog coating according to the invention.

The invention claimed is:

1. A spectacle lens comprising a substrate coated with a coating comprising silanol groups on its surface and, directly contacting this coating, a precursor coating of an anti-fog coating, wherein the precursor coating of the anti-fog coating comprises:
   at least one grafted organosilane compound having a polyoxyalkylene group comprising less than 80 carbon atoms and at least one silicon atom bearing at least one hydrolyzable group;
   a thickness lower than or equal to 5 nm; and
   a static contact angle with water of more than 10° and of less than 50°.

2. The lens of claim 1, wherein the anti-fog coating precursor coating is coated with a film of a liquid solution comprising at least one surfactant and/or hydrophilic compound with no surface active properties.

3. The lens of claim 2, wherein the anti-fog coating precursor coating is coated with a film of a liquid solution comprising a surfactant comprising poly(oxyalkylene) groups.

4. The lens of claim 1, wherein the lens has a static contact angle with water lower than or equal to 10°.

5. The lens of claim 4, wherein the lens has a static contact angle with water lower than or equal to 5°.

6. The lens of claim 1, wherein the coating comprising silanol groups on its surface is an antireflective coating or a silica-based layer deposited onto an abrasion-resistant coating.

7. The lens of claim 1, wherein the organosilane compound is a compound of formula:

$$R^1Y_mSi(X)_{3-m} \quad (I)$$

wherein:
   the Y groups independently are monovalent organic groups bound to the silicon through a carbon atom;
   the X groups independently are hydrolyzable groups;

R¹ is a group comprising a polyoxyalkylene function; and m is an integer equal to 0, 1 or 2.

8. The lens of claim 1, wherein the organosilane compound is a compound of formula:

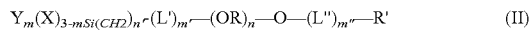 (II)

wherein:
R' is a hydrogen atom, a linear or branched acyl group or alkyl group;
$(OR)_n$ is a polyoxyalkylene group in which R is a linear or branched alkylene group;
L' and L" are divalent groups;
the Y groups independently are monovalent organic groups bound to the silicon through a carbon atom;
the X groups independently are hydrolyzable groups;
m is an integer equal to 0, 1 or 2;
m' is 0 or 1;
m" is 0 or 1;
n is an integer ranging from 2 to 30; and
n' is an integer ranging from 1 to 10.

9. The lens of claim 8, wherein R is a linear alkylene group.

10. The lens of claim 8, wherein m' is 0.

11. The lens of claim 8, wherein R' is an alkyl group.

12. The lens of claim 8, wherein m" is 0.

13. The lens of claim 8, wherein n ranges from 5 to 30.

14. The lens of claim 13, wherein n ranges from 5 to 15.

15. The lens of claim 14, wherein n ranged from 6 to 9.

16. The lens of claim 1, wherein the organosilane compound is an [alkoxy(polyalkylenoxy)alkyl]trialkoxysilane.

17. The lens of claim 16, wherein the organosilane compound is a 2-[methoxy(polyethyleneoxy)propyl]trimethoxysilane.

18. The lens of claim 17, wherein the organosilane compound is:

$CH_3O$—$(CH_2CH_2O)_{6\text{-}9}$—$(CH_2)_3Si(OCH_3)_3$, or
$CH_3O$—$(CH_2CH_2O)_{9\text{-}12}$—$(CH_2)_3Si(OCH_3)_3$.

19. The lens of claim 17, wherein the organosilane compound comprises no fluorine atom.

20. The lens of claim 1, wherein the polyoxyalkylene group comprises less than 60 carbon atoms.

21. The lens of claim 20, wherein the polyoxyalkylene group comprises less than 50 carbon atoms.

22. A method for preparing a spectacle lens of claim 1, comprising:
providing a substrate coated with a coating comprising silanol groups on its surface;
depositing onto the coating at least one organosilane compound having a polyoxyalkylene group comprising less than 80 carbon atoms and at least one silicon atom having at least one hydrolyzable group, to obtain a layer of grafted organosilane compound having a thickness lower than or equal to 5 nm, the surface of which has a static contact angle with water of more than 10° and of less than 50°.

23. The method of claim 22, further comprising removing any deposited but not grafted organosilane compound from the coating comprising silanol groups.

24. The method of claim 22, wherein the organosilane compound is deposited onto the coating comprising silanol groups via evaporation under vacuum.

25. An optical article comprising a surface covered with a coating comprising silanol groups on its surface, wherein at least a part of the surface of the coating is in direct contact with and adhered to a hydrophobic and/or oleophobic coating and at least another part of the surface of the coating is in direct contact with a coating precursor of an anti-fog coating of claim 1.

* * * * *

UNITED STATES PATENT AND TRADEMARK OFFICE
CERTIFICATE OF CORRECTION

PATENT NO.        : 8,709,588 B2
APPLICATION NO.   : 13/260697
DATED             : April 29, 2014
INVENTOR(S)       : Mamonjy Cadet, Mathieu Feuillade and Francis Henky Page 1 of 1

It is certified that error appears in the above-identified patent and that said Letters Patent is hereby corrected as shown below:

Title Page, Item (73) Assignee:

Please remove "Essilor International (Compagnie Generale d'Optique), Charenton le Pont (FR)" and replace with -- Satisloh AG, Baar (CH) --.

Signed and Sealed this
Eighteenth Day of November, 2014

Michelle K. Lee
*Deputy Director of the United States Patent and Trademark Office*